United States Patent
Dent

(10) Patent No.: US 6,535,752 B1
(45) Date of Patent: Mar. 18, 2003

(54) RADIO RECEIVER WITH POWER SAVING DURING SYNCHRONIZATION RETRIES

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/283,688

(22) Filed: Apr. 1, 1999

(51) Int. Cl.[7] ................................................. H04Q 7/32
(52) U.S. Cl. ..................... 455/574; 455/343; 455/161.2; 455/161.3
(58) Field of Search ................................. 455/574, 343, 455/38.3, 421, 434, 513, 515, 525, 161.2, 161.1, 161.3, 166.1, 166.2

(56) References Cited

U.S. PATENT DOCUMENTS

| | | | |
|---|---|---|---|
| 4,903,319 A | 2/1990 | Kasai et al. .................. 455/33 |
| 5,109,530 A * | 4/1992 | Stengel ....................... 455/38.3 |
| 5,265,270 A * | 11/1993 | Stengel et al. ............... 455/343 |
| 5,375,254 A | 12/1994 | Owen ......................... 455/54.1 |
| 5,568,513 A | 10/1996 | Croft et al. .................. 375/224 |
| 5,701,329 A | 12/1997 | Croft et al. .................. 375/224 |
| 5,754,956 A | 5/1998 | Abreu et al. ................. 455/434 |
| 5,799,256 A | 8/1998 | Pombo et al. ............... 455/574 |
| 6,128,489 A * | 10/2000 | Seazholtz et al. ....... 455/434 X |
| 6,175,733 B1 * | 1/2001 | Seekins et al. ............. 455/434 |
| 6,292,508 B1 * | 9/2001 | Hong et al. ............. 455/574 X |

* cited by examiner

Primary Examiner—William Trost
Assistant Examiner—Philip J. Sobutka
(74) Attorney, Agent, or Firm—Coats & Bennett, P.L.L.C.

(57) ABSTRACT

A method and apparatus for reducing battery drain in a mobile station of a radio communication system characterizes and stores the radio environment in which it failed to acquire synchronization with the system. The mobile station then enters a low power mode for a predetermined time duration. Upon exiting the low power mode, the mobile station determines if the radio environment has changed by more than a predetermined threshold. If so, the mobile station will re-attempt initial synchronization.

13 Claims, 3 Drawing Sheets

RADIO RECEIVER WITH POWER SAVING DURING SYNCHRONIZATION RETRIES

FIELD OF THE INVENTION

This invention relates generally to radiotelephones and particularly to reducing battery consumption in a radiotelephone when no network signal is found during an initial synchronization attempt.

RELATED ART

It is desirable in radiotelephones to minimize battery consumption in order to maximize the time required between recharging radiotelephones. When a radiotelephone is initially powered-up, it is necessary to scan all of the operative channels to obtain a signal from the base station and perform an initial synchronization of the radiotelephone. If a sufficiently strong signal to perform the initial synchronization is not found, the synchronization cannot be accomplished and the radiotelephone cannot be used. Therefore, the radiotelephone must continue to scan all channels until a sufficiently strong signal from the base station is received. However, this continual scanning results in large power consumption of battery power, and greatly shortens the time a radiotelephone may be used before it must be charged again.

In the past, attempts to minimize battery consumption during initial synchronization attempts have included incorporating a delay in synchronization attempts when it is determined that the cellular phone is out-of-range of a base station and/or turning the radio telephone on and off when the radio telephone is out-of-range.

For example, in U.S. Pat. No. 5,375,254 ("the '254 patent"), to conserve battery power, instead of continuously rescanning all channels to obtain initial synchronization when the radio telephone is out-of-range, the successive rescans are made less frequently as the time interval from when the handset was last in-range increases, until a predetermined maximum interval has been reached between successive rescans. Thus the '254 patent reduces battery consumption by adaptively reducing the frequency of attempting to find a channel for initial synchronization. The interval between rescans in the '254 patent is not a function of the signal strength measured on a channel, but rather a function of the time since a valid signal was last acquired. The disadvantages of increasing the interval between rescans is that the handset will not respond rapidly to appearance of a signal.

In U.S. Pat. No. 4,903,319 ("the '319 patent"), a battery-powered portable radio telephone for use in a mobile telephone network receives signals from the network and determines from the received signal whether the radio telephone is within the range of the service area of the network. A battery saver is provided to periodically interrupt the battery power of the telephone when the radiotelephone is out of range of the service area. Thus when no valid signal is detected, the handset is switched on and off in a periodic duty cycle to conserve power. The '319 patent suffers from the same disadvantage as the '254 patent in that to achieve sufficient reduction in battery consumption, the time between successive re-powering of the radiotelephone should be much longer than the time to obtain initial synchronization. Therefore, a radiotelephone comprising the '319 patent will be slow to respond to the appearance of a signal.

The increasing availability of cellular spectrum has increased the complexity of the sequence the phone must execute to rapidly find a signal with which it is compatible. The channels of this spectrum are used by various operators in the U.S.A. to transmit different, incompatible signals. These signals include cellular telephone signals for systems such as the Advanced Mobile Phone System (AMPS); Digital AMPS (D-AMPS); Global System for Mobile Communication (GSM or, in the United States, PCS1900); and Code Division Multiple Access (CDMA) system. Because of the increased channel space in these systems, the process of finding and synchronizing to a control channel must be improved to reduce the battery power required for this function.

SUMMARY

A radiotelephone according to one embodiment of the present invention is designed to operate in a mobile communication system such as a Code Division Multiple Access (CDMA) system, a Time Division Multiple Access (TDMA) system, or other systems presently known or developed in the future. A network station transmits traffic signals to individual radiotelephones engaged in communications via the CDMA system as well as broadcast information intended for radiotelephones not presently engaged in communications via the system. The broadcast information contains known signal patterns for use by radiotelephones at power-on to acquire code-lock synchronization with the broadcast information.

When a radiotelephone fails to acquire synchronization upon power-up after a predetermined time, the radiotelephone will, according to one embodiment, characterize and electronically memorize the radio environment in which it failed to acquire synchronization. In this embodiment, the memorized characteristic of the radio environment includes at least the total received signal strength in each radio frequency channel upon which synchronization was attempted. The radiotelephone then enters a low power mode in which only a low-power clock-timer circuit is active to re-power the radiotelephone at periodic intervals to re-characterize the radio environment.

After re-characterizing the radio environment, the radiotelephone then detects whether the radio environment has changed by more than a predetermined threshold. If the radio environment has changed by more than the predetermined threshold, the radiotelephone will re-attempt initial synchronization.

In one embodiment, the clock-timer circuit causes the radio telephone to re-measure the total received signal strength in at least one of the previously tested frequency channels after a given time, for example, after one second. The radio frequency environment is characterized by averaging over a time that is greater than the reciprocal of the receiver bandwidth by about two orders of magnitude, which, for a receiver bandwidth of 1 to 5 MHz is still only about 100 uS. Such averaging allows a measurement accuracy of a fraction of a decibel. As a result, the duty factor of making repeat measurements of signal strength is only 1/10000, leading to very low average battery consumption during a prolonged power-up where the signal strength is not great enough for initial synchronization. Accordingly, unlike previous devices, the illustrated embodiment does not deplete the battery in making continuous attempts to synchronize with a network station.

The illustrated embodiment only makes a new attempt to synchronize if the average signal strength changes by a predetermined amount, for example, by 3 dB, indicating appearance of a signal or disappearance of interference. The channel upon which the illustrated embodiment makes repeat measurements can be cyclically varied through the list of radio channels on which initial synchronization failed. If a second subsequent attempt to acquire synchronization on a given radio channel also fails, the radio environment on that channel will be updated in memory, so that a reattempt will not be made until the environment changes once more from the updated value to a new value differing by more than a threshold amount.

In one embodiment, synchronization is attempted with sufficient frequency to rapidly detect the appearance of a signal, but also reduces battery consumption by keeping the power-on time to a minimum by making only a short signal strength measurement, rather than a full synchronization re-attempt. The signal strength measurement is compared with the signal strength measured on that channel and stored during the initial, unsuccessful synchronization attempt and a full new synchronization attempt is not made unless the new signal measurement exceeds the stored signal measurement by a predetermined threshold.

Alternate embodiments can include other features such as searching for initial synchronization on frequency channels in a prioritized order or using information about the channels on which synchronization has been acquired most recently. An initial synchronization attempt may also commence by making a rapid determination of signal strength on all channels to be searched and making synchronization attempts on those frequency channels having the greatest signal plus noise power content. Synchronization attempts may also include searching in a reduced bandwidth for an unmodulated signal burst that occurs with known frequency (also known as the power profile method) in order to acquire coarse time and frequency synchronization prior to searching for fine synchronization by correlation of shifts of the received signal with a known code or signal pattern.

These and other features and advantages of the invention will be apparent upon consideration of the following detailed description of the presently preferred embodiments of the invention, taken in conjunction with the appended drawings.

DETAILED DESCRIPTION OF THE PRESENTLY PREFERRED EMBODIMENTS

Figure 1:
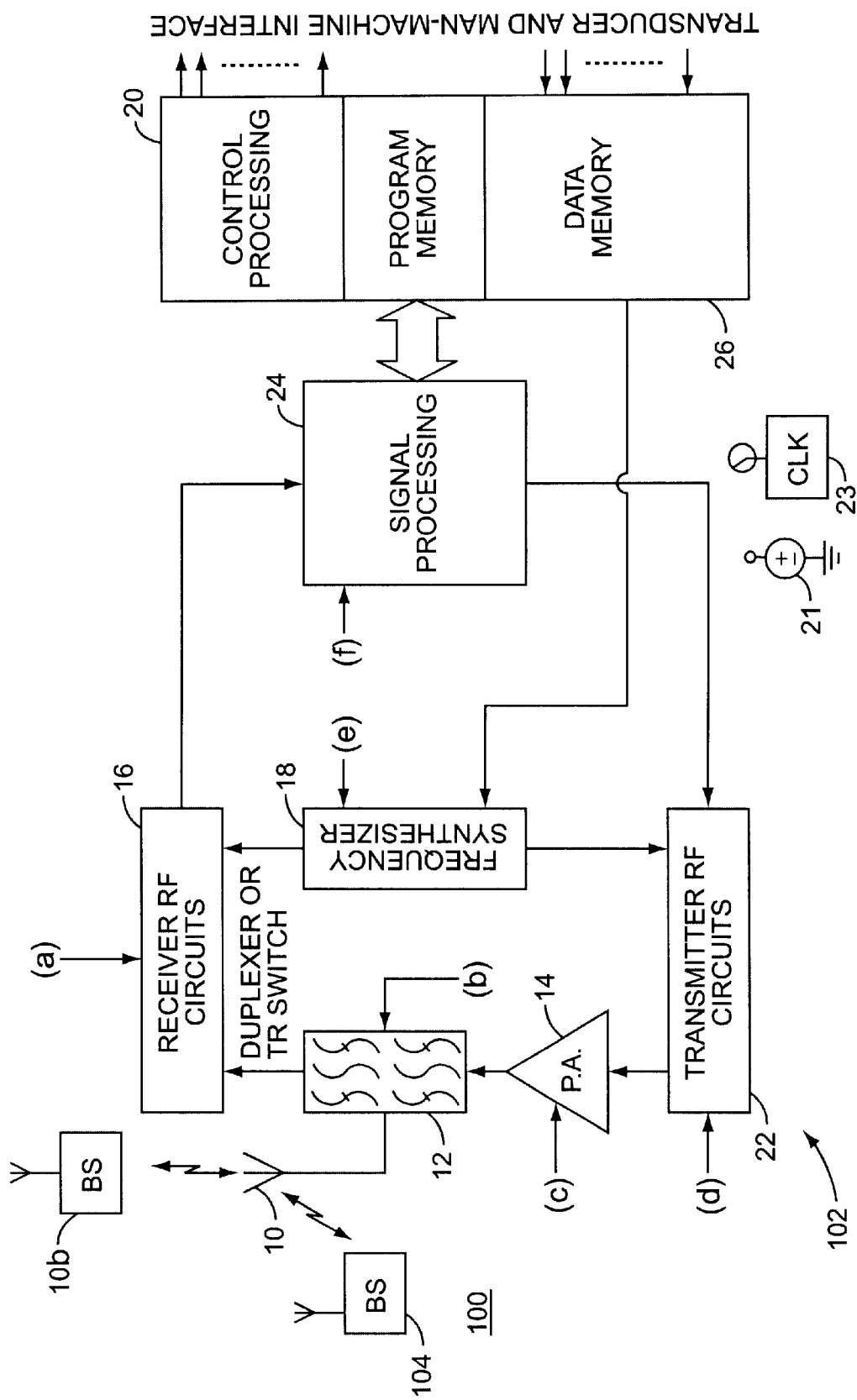
FIG. 1 is a block diagram of a radio communication system.

Referring to FIG. 1, it shows a block diagram of a radio communication system 100. The system 100 includes a mobile station 102 and one or more remote base stations 104, 106. The base stations 104, 106 provide communications with a mobile station such as mobile station 102 in a fixed geographic region near the base stations 104, 106. Radio communication between the base stations 104, 106 and the mobile station is conducted according to a standard communication protocol. Examples of such protocols include Analog Mobile Phone System (AMPS), which is an analog standard; TIA/EIA Interim Standard IS-136, which is a time division, multiple access (TDMA) digital standard; and TIA/EIA Interim Standard IS-95, which is a code division multiple access (CDMA) digital standard.

The mobile station 102 may also be referred to as a radiotelephone. Examples of a suitable radiotelephone include cellular and cordless telephones such as are now known and may be developed in the future. In other examples, the mobile station is a communication device capable of one-way or two-way radio communication with a remote base station.

In the illustrated embodiment, the mobile station 102 includes an antenna 10, duplex filter 12, a transmit power amplifier 14, radio transmitter circuits 22, and a plurality of radio receiver circuits 16. The mobile station 102 further includes a frequency synthesizer 18, signal processing circuits 24, and a control processor 20. The mobile station 102 still further includes a battery 21 for powering the mobile station 102 and a clock 23 for generating timing signals. Not all connections are shown in the drawing so as not to unduly complicate the drawing figures.

Radio signals are received and transmitted via an antenna 10. A duplex filter 12 connects a transmit power amplifier 14 and a plurality of receiver radio frequency (RF) circuits 16 simultaneously to the antenna 10 when signals are simultaneously transmitted and received, as in radiotelephones operating with analog frequency modulation, such as AMPS radiotelephones, or CDMA radiotelephones. In an alternate embodiment, the duplex filter 12 may be replaced by a transmit/receive switch in radio telephones that do not need to transmit and receive at the same time, such as phones conforming to TDMA waveforms. The illustrated embodiment is described for use in conjunction with a CDMA system for illustrative purposes only.

The receiver RF circuits 16 are adapted to receive signals on a selectable channel frequency determined by a frequency synthesizer 18 controlled by a control processor 20. Likewise, the frequency synthesizer 18 adapts a plurality of transmitter RF circuits 22 to generate modulated signals at the desired transmit channel frequency. A plurality of signal processing circuits 24 process received signals that have been filtered, amplified and downconverted in the receiver RF circuits 16 to demodulate and decode them to recover information signals such as speech or data. The signal processing circuits 24 can also process signal strength information from receiver RF circuits 16 into a suitable form for recording in processor data memory 26.

The signal processing circuits 24 also process speech or data signals to encode them for transmission. The signal processing circuits 24 may, for example, comprise Analog-to-Digital and Digital-to-Analog converters, error correction coders and decoders, numerical demodulators such as equalizers or analog processing circuits such as frequency discriminators. Control processor 20 also supplies a number of power control lines (a, b, c, d, e, f) to the other blocks to effect power on/off at appropriate times. These control lines can be power supply lines from battery voltage regulators encompassed within the definition of control processor 20 or else can comprise logic control lines that control whether a block is in a functional, current-consuming state or else in a non-current consuming or low-power standby state.

For communicating with a remote base station such as base stations 104, 106, the mobile station 102 must obtain and retain synchronization with the base station. Typically, synchronization is obtained by detecting at the mobile station 102 control signals broadcast by the base station. The control signals may contain timing, identification and other information. Using this information, the mobile station synchronizes to the base station and begins two way communication.

A method for providing reduced power consumption during synchronization retries can be implemented within control processor 20 by a suitable stored control program adapted to control the frequency synthesizer 18 to select reception on different channel frequencies, to manipulate power control lines (a–f) and to input and process signal measurements such as signal strength measurements from signal processing circuits 26. In the illustrated embodiment, the control processor 20 also connects to audio transducers such as an earpiece, microphone and ringer as well as other man-machine interfaces such as keyboard and display.

The control processor 20 detects when a user activates an ON/OFF button to turn the radiotelephone on. Control processor 20 then goes through a power-up schedule which can include self-test and self-calibration steps. When these initial steps are complete, the control processor 20 controls the receiver RF circuits 16 to search for and lock to a valid control channel signal radiated by a network base station.

Searching for and acquiring lock to CDMA signals is slow and power consuming for the receiver RF circuits 16 because of the need to align a local code generator with received signals to fractions of a microsecond accuracy. Thus, a search for a CDMA base station signal can be a search of the three-dimensional space of frequency, timing and code uncertainty which requires more signal processing and therefore more energy from the battery than searching only the single frequency dimension for AMPS signals or GSM TDMA signals.

The illustrated embodiment concerns the behavior of a radiotelephone upon failure to detect any valid base station signal within a reasonable, predetermined time after switch-on. The objective is to avoid depleting the battery 21 in fruitless signal searching in order to reserve the battery capacity for making calls when the radio telephone is once more within a service area and can receive an adequate base station signal. The illustrated embodiment comprises storing or memorizing the channel frequencies that were searched without finding a valid signal and memorizing in association thereto the signal strength on the channel when no valid signal was detected.

An initial acquisition sequence will usually detect a control channel signal at signal strengths below those needed for successful communication, so that detection of the control signal does not limit the radius of the service area. Therefore, if the radiotelephone fails to detect a control channel signal within a given channel above a given threshold level, it is reasonable to assume that communication opportunities will not arise until the signal strength has increased by a threshold on the order of the margin between detectable control channel signal strength and the minimum signal strength needed for communication.

The reason for failing to detect a control channel signal is not necessarily that the absolute signal strength is too low, but could also be that the signal-to-interference ratio is too low. The total signal strength measured in a channel can thus be well above the noise floor while still being unable to detect a valid signal, because of interference in the channel. Thus, recording that signal strength and periodically checking for a change in signal strength relative to the previously recorded value can indicate whether a new evaluation of that channel is worthwhile. When a signal strength recorded is close to the noise floor, an increase in signal strength may be the change which would indicate a re-evaluation of the channel to be worthwhile. On the other hand, a recorded signal well above the noise floor indicates the presence of significant interference. In that case a reduction of signal strength and therefore interference level may be the change indicative of a re-evaluation.

When a change in signal strength on a channel from the previously recorded value triggers a re-evaluation of the channel, and still no valid signal is found, the new signal strength at which no valid signal was found may ovate the old recorded strength. To account for the possibility of strong interference, both the maximum value of signal strength at which no valid signal has been found on the channel and the minimum value of signal strength at which no signal has been found on the channel may be recorded. No further evaluation of that channel may then be deemed worthwhile unless the signal moves outside of the window of signal strength extending from the minimum no-signal strength and the maximum no-signal strength.

Thus, according to the illustrated embodiment, an initial sync search is performed after power-up according to any known method or the improved methods as for example described in U.S. patent applications Ser. Nos. 09/236,983 (Dent, entitled "Multi-stage CDMA Synchronization with Parallel Execution") and Ser. No. 09/198,789 (Dent, entitled "Accelerated Scanning of TDMA Channels"), both of which are hereby incorporated by reference herein. For each searched channel on which no valid signal is found, at least one signal environment characterization parameter of the channel is stored. In one embodiment, the signal environment characterization parameter is a received signal strength measurement. In other embodiments, it may be an averaged signal strength measurement, or any other suitable parameter.

All channels in a channel search list are searched. The channels in the list might contain all channels or just a subset of channels known to be used for control channels. When all channels in a channel search list have been searched without finding a valid signal, the control processor 20 powers down the radiotelephone to the minimum power condition (e.g. OFF) and starts a low-power timer to time a power down interval. The power down interval has a predetermined time duration. The power down interval can be relatively long, as an environment in which no valid signal at all was detectable is unlikely to change in a few seconds. Thus a power down period of perhaps ten seconds or 30 seconds could be used, after which the signal environment characterization parameters for the channels can be tested again, The illustrated embodiment can comprise using a long power down period, after which all channels are re-characterized and any one showing a characterization parameter change indicative of re-evaluation is then subjected to a full re-evaluation. In an alternate embodiment, shorter power down periods can be used, after which one or a smaller number of previously tested channels are re-evaluated sequentially. In a further alternate embodiment, each previously tested channel is not necessarily evaluated equally often, rather channels in the channel search list that have a high historical probability of containing a control channel signal may be re-evaluated on a more frequent schedule than those having a historically low probability of containing a control channel signal.

When the power-down interval timer re-enables the receiver RF circuits 16, the control processor 20 selects channel frequencies sequentially from the prioritized search list and programs the frequency synthesizer 18 to cause reception of signals on the selected channel. A signal strength measurement is then made and compared with memorized values. If the signal strength is still in a region deemed unworthy of a full channel re-evaluation, the next channel is selected from the list and the procedure repeated until a predetermined number of channels from the list have been used. The predetermined number may be only one channel. After testing the predetermined number of channels without finding a change indicative of a fill signal evaluation, the power-down timer is restarted and the phone placed in the lowest power condition once more. If any channel, upon re-evaluation, shows a change in its characterization parameter indicative of a full signal re-evaluation, an attempt to discover and synchronize with a control channel signal is made.

If successful synchronization is achieved, the phone enters another mode called "standby mode" in which it listens to the control channel for call alert messages. It may also transmit a re-registration message, also known as a location update message to the network to indicate the phone's new position within the network, if it has changed. The standby mode may also comprise a power saving mode also known as a "sleep mode" in which the phone awakens to listen to the control channel broadcast only in allocated time slots in which that phone may be paged. Standby power saving techniques are described in U.S. Pat. Nos. 5,568,513 and 5,701,329, both of which are hereby incorporated by reference herein.

Figure 2:
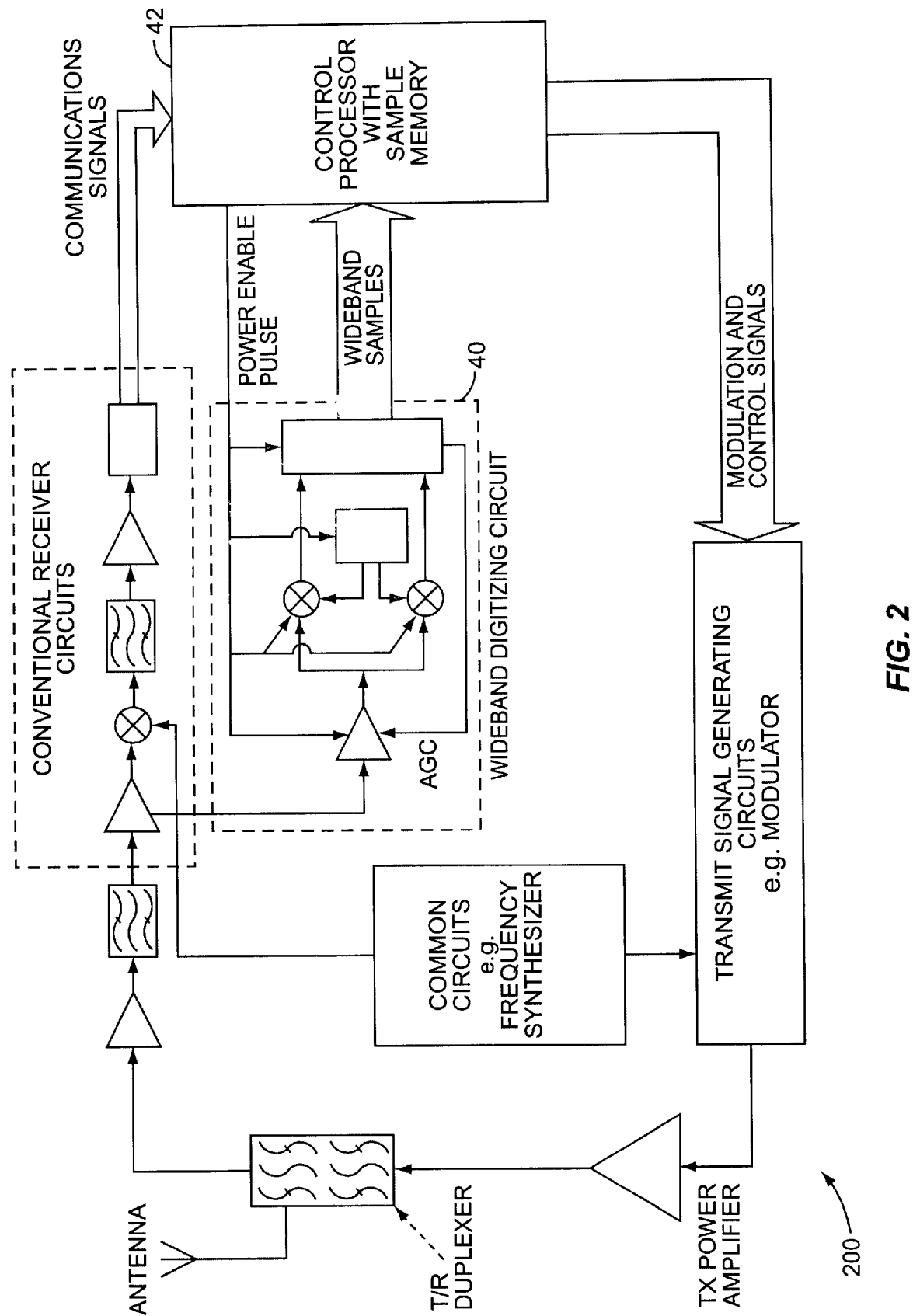
FIG. 2 is a block diagram of an alternative embodiment of the radiotelephone of FIG. 1.

Referring to FIG. 2, a block diagram of a second embodiment of the present invention is shown as incorporated in a radiotelephone 200. The radiotelephone 200 includes a wideband receiver 40 delivering digitized samples to a control processor 42. The wideband receiver 40 need only be powered up for a time equal to a few times the reciprocal of the channel spacing. In the case of 30 KHz channel spacing, the power up time may be typically 100 $\mu$sec. During the power up time, the receiver 40 collects wideband signal samples which can be processed by Fourier analysis to determine the signal strength in a large number of channels at once. The receiver 40 may also receive more than one channel at once in a receiver bandwidth wider than the channel spacing to collect wideband signal samples which are subsequently digitally processed to determine signal strength in each of the encompassed channels.

Figure 3:
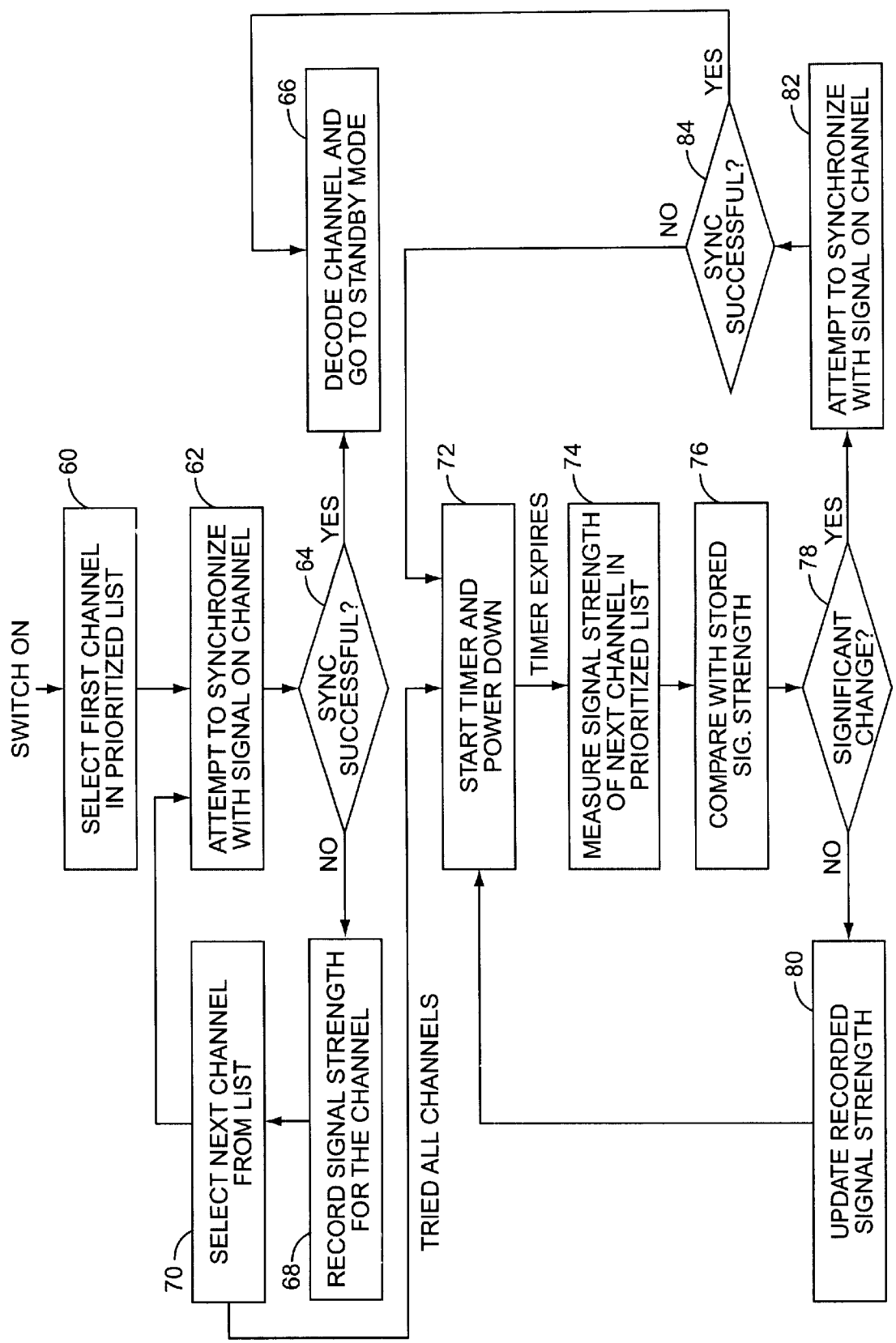
FIG. 3 is a flow chart illustrating a method of operating the radiotelephone of FIG. 1 and FIG. 2.

Referring now to FIG. 3, a flow chart for one embodiment of the present invention is shown. The flow chart shows implementation of the control processor 20 in FIG. 1 and control processor 42 in FIG. 2. After switch on, the radiotelephone enters step 60 to perform initial synchronization and selects the first channel from the prioritized channel list. At step 62, the receiver RF circuits 16 are tuned to the selected channel and an attempt is made to discover and synchronize with any signal on the selected channel. This can for example involve performing correlations with many shifts of a CDMA spreading code and accumulating the correlations until a sufficient confidence level is reached that a signal is detected. Step 62 can also comprise early rejection of the hypothesis that the channel contains a valid signal to enable rapid progression to the next channel.

The synchronization accept/reject test is represented by step 64. In step 64, if the channel is valid, in which case progression is made to step 66 where the signal is decoded and the radiotelephone enters the normal standby mode. If at step 64 the channel is deemed not to contain a valid signal, progression is made to step 68, where the signal strength or other environment characterization parameter of the channel is recorded. Then at step 70 the next channel in the list is selected and return made to step 62.

If, at step 70, all channels have been tested, the algorithm progresses to step 72, where a power-down timer is started and the phone placed in a low-power condition where, in one embodiment, only a low-power timer is operative. After the timer period has expired, at step 74 the signal strength on the next channel in the list is measured, this being the first channel if a branch has just occurred from step 70. At step 76, a comparison is made between the measured signal strength and the strength recorded in step 68 for the same channel. If the signal strength is within a window of the same values as recorded at step 68, then there is no reason to believe that a new sync attempt will be any more successful. Thus, at step 78, if the comparison at step 76 indicates that no significant change has occurred, step 80 updates the recorded signal strength and the flow chart returns to step 72 to power down the phone and start the power down timer again. Variations in this scheme have already been described above, in which a sub-group of channels may be re-tested at steps 74, 76 and 78 before re-entering the power down mode at step 72 after updating their corresponding signal strength windows at step 80.

If, at step 78, it is determined that a significant change in signal strength has occurred relative to the last updated values, a new synchronization attempt may be worthwhile. Then an attempt to discover and synchronize with a signal on the channel showing significant change in signal strength is made at step 82. If successful synchronization is established, normal standby mode is entered at step 66, otherwise a return is made to step 72 to enter the power down mode and start the power down timer again. Thus, in one embodiment, after initial failure to find a valid signal in steps 60, 62, 64, 68 and 70, the radiotelephone enters the mode defined by steps 72 to 80. In this mode, the receiver is only power up relatively infrequently and for very short times to determine if conditions on any channel have changed so much as to make another full synchronization search of that channel again worthwhile. This results in reduction of battery consumption by a large factor when no signal is receivable, avoiding unnecessarily depleting the battery.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of the invention.

What is claimed is:

1. A method for initiating communication between a mobile station and a remote base station in a radio communication system, the method comprising the steps of:

(a) searching a plurality of channels for a valid signal;

(b) if no valid signal is found on a channel, storing a signal environment characterization parameter for the channel;

(c) if no valid signal is found on the plurality of channels, entering a low power state for a predetermined time duration;

(d) after the predetermined time duration, searching one or more channels of the plurality of channels for a signal environment characterization parameter substantially changed from the signal environment characterization parameters stored for the one or more channels; and (e) if a substantially changed signal environment characterization parameter for one or more channels is found, performing a full synchronization search on the one or more channels.

2. The method of claim 1 wherein the signal environment characterization parameter comprises a received signal strength indication.

3. The method of claim 1 wherein step (e) comprises searching channels having a relatively high probability of containing a control signal.

4. The method of claim 1 further comprising the steps of:
(f) repeating steps (c) through (e) until a valid signal is found.

5. The method of claim 4 further comprising the step of:
(g) varying the time duration on subsequent searches.

6. The method of claim 1 further comprising the step of:
maintaining a channel list of channels to be searched for a valid signal.

7. The method of claim 6 wherein step (a) comprises searching only channels of the channel list.

8. The method of claim 6 wherein step (a) comprises searching only a subset of channels of the channel list.

9. A radiotelephone operable on a communication system including one or more remote base station, the radiotelephone comprising:

a battery;

a receiver tunable to a plurality of channels;

a control processor configured to control the receiver to tune to sequential channel of the plurality of channels to locate a valid control channel signal transmitted by the one or more remote base station, the control processor tuning the receiver in an initial acquisition sequence and waiting a predetermined time duration if no valid control channel signal is located, the control processor storing a signal environment characterization parameter for each channel during the initial acquisition sequence, the control processor comparing a measured signal environment characterization parameter with a stored signal environment characterization parameter for respective channels following the predetermined time duration, the control processor tuning the receiver to a channel to perform a synchronization attempt when the associated measured signal environment characterization parameter exceeds the stored signal environment characterization parameter by a predetermined threshold.

10. The radiotelephone of claim 9 further comprising a clock configured to generate timing signals for clocking the control processor.

11. The method of claim 9 wherein the signal environment characterization parameter comprises a received signal strength indication.

12. A wireless communication device for radio communication with one or more remote base stations, the wireless communication device comprising:

memory means for storing a list of channels and associated signal measurements;

initial synchronization means for performing an initial synchronization search of channels in the list of channels for valid signals from one of the one or more remote base stations, for classifying a channel as one of containing a valid signal and not containing a valid signal, and for making signal measurements;

control processor means coupled to the memory means and the initial synchronization means for storing the signal measurements in association with channels in the channel list classified as not containing a valid signal;

timer means for switching the wireless communication device to a low power state for a predetermined time duration under control of the control processor means when all the channels in the channel list have been classified as not containing a valid signal;

means for making a repeat signal measurement on at least one channel in the channel list after the predetermined time;

comparison means for comparing the repeat signal measurement with a corresponding one of the signal measurements; and decision means responsive to the comparison means for deciding to repeat an initial synchronization search on the at least one channel.

13. The wireless communication device of claim 12 further comprising:

updating means for updating the signal measurements in the memory means after repeat of an initial synchronization search and the initial synchronization means again classifies the at least one channel as not containing a valid signal.

* * * * *